United States Patent Office 3,782,986
Patented Jan. 1, 1974

3,782,986
PROCESS FOR PRODUCING PLASTER FROM BYPRODUCT GYPSUM
Gerald H. Vincent, Fort Lauderdale, Fla., assignor to Combustion Engineering, Inc., Windsor, Conn.
No Drawing. Filed Nov. 12, 1970, Ser. No. 89,121
Int. Cl. C04b 11/10
U.S. Cl. 106—110
7 Claims

ABSTRACT OF THE DISCLOSURE

A method of producing plaster from byproduct or synthetic gypsum is disclosed including milling the gypsum, adding boric acid as a calcination modifier, calcining the modified gypsum to yield plaster, adding magnesium hydroxide and again milling the plaster to a fine particle size to yield a product with improved properties.

BACKGROUND OF THE INVENTION

Plasterboard or wall board as produced from natural gypsum is a strong, hard surfaced, rigid sheet of plaster encased in a heavy paper sheath. The bond between the paper and properly prepared natural gypsum plaster is firm and will last indefinitely and the product has relatively high flexural strength. However, supplies of natural gypsum are rather localized which can add significantly to the cost of wallboard and other plaster products due to the costs of shipping the gypsum from the mines to the producing plants.

Therefore, many efforts have been made to produce plaster from a synthetic gypsum known as byproduct gypsum. Byproduct gypsum is the waste material which results from the treatment of phosphorus-bearing ores with sulfuric acid to produce phosphoric acid according to the following reaction:

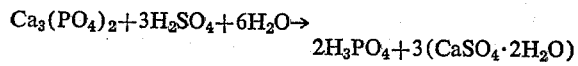

These efforts, however, have failed to yield a product of high quality. The main problem in the manufacture of wallboard has been the lack of a sufficient bond between the plaster and the paper sheet resulting in "peelers." Other problems are low tensile and flexural strength, discoloration of the sheet and a lack of bond between the sheet and paint. It has been thought that these problems were primarily caused by the presence of residual acidic materials in the byproduct gypsum either as free acid or occluded acid within the gypsum crystals which is freed upon calcination. Various treatments to neutralize these acids, although of some value, have not eliminated all of the problems.

SUMMARY OF THE INVENTION

An object of the present invention is to produce plaster from byproduct gypsum which will yield a satisfactory product and particularly a wallboard product exhibiting a good bond between the plaster and the paper and which has high flexural strength. The present invention involves the manufacture of plaster wherein the byproduct gypsum is broken down by grinding or milling both before and after calcination and wherein modifiers are added to effect the calcination process and the plaster product. The details of this process as well as other objects and advantages will be apparent from the following description.

DETAILED DESCRIPTION OF THE PREFERRED EMBODIMENTS

Plaster according to the present invention is produced from byproduct gypsum obtained from the sulfuric acid or wet process for making phosphoric acid. This byproduct gypsum is available in various conditions. First, it may be obtained directly from the filter pans or screens and contains about 25 percent free water or it may have been centrifuged and contain on the order of only 3 percent free water. A typical byproduct gypsum would contain about 96 percent $CaSO_4 \cdot 2H_2O$ on the dry basis with the remainder being small amounts of various impurities such as $CaHPO_4$, $H_3PO_4$, $SiO_2$, $CaF_2$ and aluminum and iron oxides. Some sulfuric, hydrofluoric and hydrochloric acids may also be present. The byproduct gypsum is in the form of relatively large single crystals and the sizes and shapes of these crystals may vary with variations in the process by which they are produced.

The first step in the present invention is to remove excess free water so that a milling operation can be effectively carried out. The water removal may be carried out in any conventional type of drier such as a fluidized bed drier which is operated at a temperature below the calcination temperature. The amount of free water remaining after drying would preferably be no greater than 0 to 1.0 percent.

After drying, the byproduct gypsum is subjected to a precalcination milling. An impact mill is preferred for this operation although other types of mills such as roller mills could be used. It may be desirable to remove large particles of the gypsum before this milling operation with these large particles being broken up and recycled. This precalcination milling should be such as to yield a finely divided gypsum preferably having a Blaine surface area of at least 4000 cm.$^2$/g. A representative particle size analysis would be:

| Mesh size— | Weight percent passing |
|---|---|
| 100 | Trace |
| 140 | 98 |
| 200 | 97 |
| 325 | 90 |

The next step in the process of the present invention is the addition of from 0.25–1.0 percent by weight dry boric acid in granular or powder form to the milled byproduct gypsum. This boric acid acts as a calcination modifier and although the specific mechanisms are not known, it has an effect on the "boiling temperature" of the calcination process and results in a plaster having an increased particle surface area and decreased setting times as will be shown hereinafter. Also, there is a decrease in the power required to drive the agitator in the calcining kettle.

The byproduct gypsum with the added boric acid is next subjected to the conventional calcination process in which the water of hydration is expelled to yield the hemihydrate form ($CaSO_4 \cdot \frac{1}{2}H_2O$) known as plaster of Paris or stucco and referred to herein as plaster. Normal kettle calcining temperatures for gypsum are about 350° F. but with the added boric acid, the calcining temperature increase to about 365° F. without any increase in the total B.t.u. input. As pointed out above, the result is an improved plaster product.

Another feature of the present invention is the addition of magnesium hydroxide either to the kettle during the calcining operation or to the finished plaster after calcining. This addition produces a significant increase in the compressive strength of the resulting plasterboard. For example, standard compressive strength tests on plaster cubes made from the same raw materials indicate an increase from about 1600 lb./sq. in. up to about 2200 lb./sq. in. when processed by the present invention. The magnesium hydroxide is added in an amount equivalent to 0.25–5.0 percent by weight of the calcined gypsum on the dry basis.

After calcination, which may include or be followed by the addition of the magnesium hydroxide, the plaster is subjected to a post-calcination milling which is also preferably carried out in an impact mill. After this milling operation, the Blaine surface area is about 9000 cm.²/g. as compared to a Blaine surface area of about 6000 cm.²/g. for plaster prepared from byproduct gypsum including the pre- and post-calcination milling but without the boric acid modifier. As a comparison, wallboard produced from plaster made from byproduct gypsum without the boric acid modifier has setting times on the order of 25 to 40 minutes while wallboard made from plaster which has included the boric acid modifier has a setting time of about 15 to 20 minutes.

While I have illustrated and described a preferred embodiment of my invention, it is to be understood that such is merely illustrative and not restrictive and that variations and modifications may be made therein without departing from the spirit and scope of the invention. I, therefore, do not wish to be limited to the precise details set forth but desire to avail myself of such changes as fall within the purview of my invention.

What is claimed is:

1. A method of producing plaster from byproduct gypsum comprising the steps of:
    (a) drying said byproduct gypsum such that the amount of free water remaining is no greater than about 1.0 percent by weight;
    (b) milling said byproduct gypsum to produce a Blaine surface area of at least 4000 square centimeters per gram;
    (c) introducing boric acid into said byproduct gypsum;
    (d) calcining said milled byproduct gypsum containing said boric acid to produce plaster;
    (e) milling said plaster until it has a Blaine surface area of at least about 9000 square centimeters per gram.

2. A method as recited in claim 1 wherein the amount of boric acid added on the dry basis is between about 0.25 percent and 1.0 percent by weight of the milled byproduct gypsum.

3. A method as recited in claim 2 wherein said boric acid is added in the dry form.

4. A method as recited in claim 1 and further including the step of adding magnesium hydroxide to said plaster.

5. A method as recited in claim 5 wherein said magnesium hydroxide is added during calcining step (d).

6. A method as recited in claim 4 wherein said magnesium hydroxide is added subsequent to calcining step (d).

7. A method as recited in claim 4 wherein the amount of magnesium hydroxide added is between about 0.25 percent and 5.0 percent by weight of the plaster on the dry basis.

References Cited
UNITED STATES PATENTS

| | | | |
|---|---|---|---|
| 1,900,381 | 3/1933 | Hansen | 106—110 |
| 3,445,323 | 5/1969 | Schnabel | 106—110 |
| 3,520,708 | 7/1970 | Chambers | 106—110 |

JAMES E. POER, Primary Examiner